United States Patent
Butcher et al.

(10) Patent No.: US 10,419,239 B2
(45) Date of Patent: Sep. 17, 2019

(54) SWITCH DEPENDENT TEAMING FOR HIGH AVAILABILITY OF VIRTUAL NETWORK FUNCTIONS

(71) Applicant: DELL PRODUCTS, LP, Round Rock, TX (US)

(72) Inventors: Andrew Butcher, Cedar Park, TX (US); Lee E. Ballard, Georgetown, TX (US); Hendrich M. Hernandez, Round Rock, TX (US); Jon F. Lewis, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 325 days.

(21) Appl. No.: 15/385,820

(22) Filed: Dec. 20, 2016

(65) Prior Publication Data

US 2018/0176036 A1    Jun. 21, 2018

(51) Int. Cl.
*G06F 15/16* (2006.01)
*H04L 12/46* (2006.01)
*H04L 29/08* (2006.01)
*H04L 29/06* (2006.01)

(52) U.S. Cl.
CPC .......... *H04L 12/4633* (2013.01); *H04L 67/10* (2013.01); *H04L 67/2814* (2013.01); *H04L 67/2833* (2013.01); *H04L 69/22* (2013.01); *H04L 2212/00* (2013.01)

(58) Field of Classification Search
CPC . H04L 12/4633; H04L 67/10; H04L 67/2814; H04L 67/2833; H04L 69/22; H04L 2212/00

USPC ......................................................... 709/227
See application file for complete search history.

(56) References Cited

U.S. PATENT DOCUMENTS

| | | |
|---|---|---|
| 6,907,469 B1 | 6/2005 | Gallo et al. |
| 2015/0358231 A1* | 12/2015 | Zhang ..................... H04L 45/38 370/392 |

OTHER PUBLICATIONS

IEEE 802.1: 802.1AX-Rev—Link Aggregation Revision, Sep. 10, 2011, pp. 1-10; http://www.ieee802.org/1/pages/802.1AX-rev.html.
"Networking Bodges: All sorts of things about LACP and LAGs," blog posted by Foeh Mannay, Dec. 21, 2012; pp. 1-11; http://networkingbodges.blogspot.com/2012/12/all-sorts-of-things-about-lacp-and-lags.html.
U.S. Appl. No. 14/842,801, filed Sep. 1, 2015.

* cited by examiner

*Primary Examiner* — Wing F Chan
*Assistant Examiner* — Joseph R Maniwang
(74) *Attorney, Agent, or Firm* — Larson Newman, LLP

(57) ABSTRACT

An information handling system includes a top of rack having a port, and a server having a network interface card and a controller. The port of the top of the rack transmits a link aggregation control protocol (LACP) packet. The network interface card receives the LACP packet from the port of the top of rack, and forwards the LACP packet. The controller receives the LACP packet from the network interface card, and to determine whether to update or create a bond associated with the port and a destination virtual machine of the LACP packet. The LACP packet is transmitted from the bond to the network interface card, and in response to the LACP packet being received at the network interface card, the LACP packet is provided to the destination virtual machine.

13 Claims, 7 Drawing Sheets

SWITCH DEPENDENT TEAMING FOR HIGH AVAILABILITY OF VIRTUAL NETWORK FUNCTIONS

FIELD OF THE DISCLOSURE

The present disclosure generally relates to information handling systems, and more particularly relates to switch dependent teaming for high availability of virtual network functions.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems.

SUMMARY

An information handling system includes a top of rack having a port, and a server having a network interface card and a controller. The port of the top of the rack may transmit a link aggregation control protocol (LACP) packet. The network interface card may receive the LACP packet from the port of the top of rack, and may forward the LACP packet. The controller may receive the LACP packet from the network interface card, and may determine whether to update or create a bond associated with the port and a destination virtual machine of the LACP packet. In an embodiment, the LACP packet may be transmitted from the bond to the network interface card, and in response to the LACP packet being received at the network interface card, the LACP packet may be provided to the destination virtual machine.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
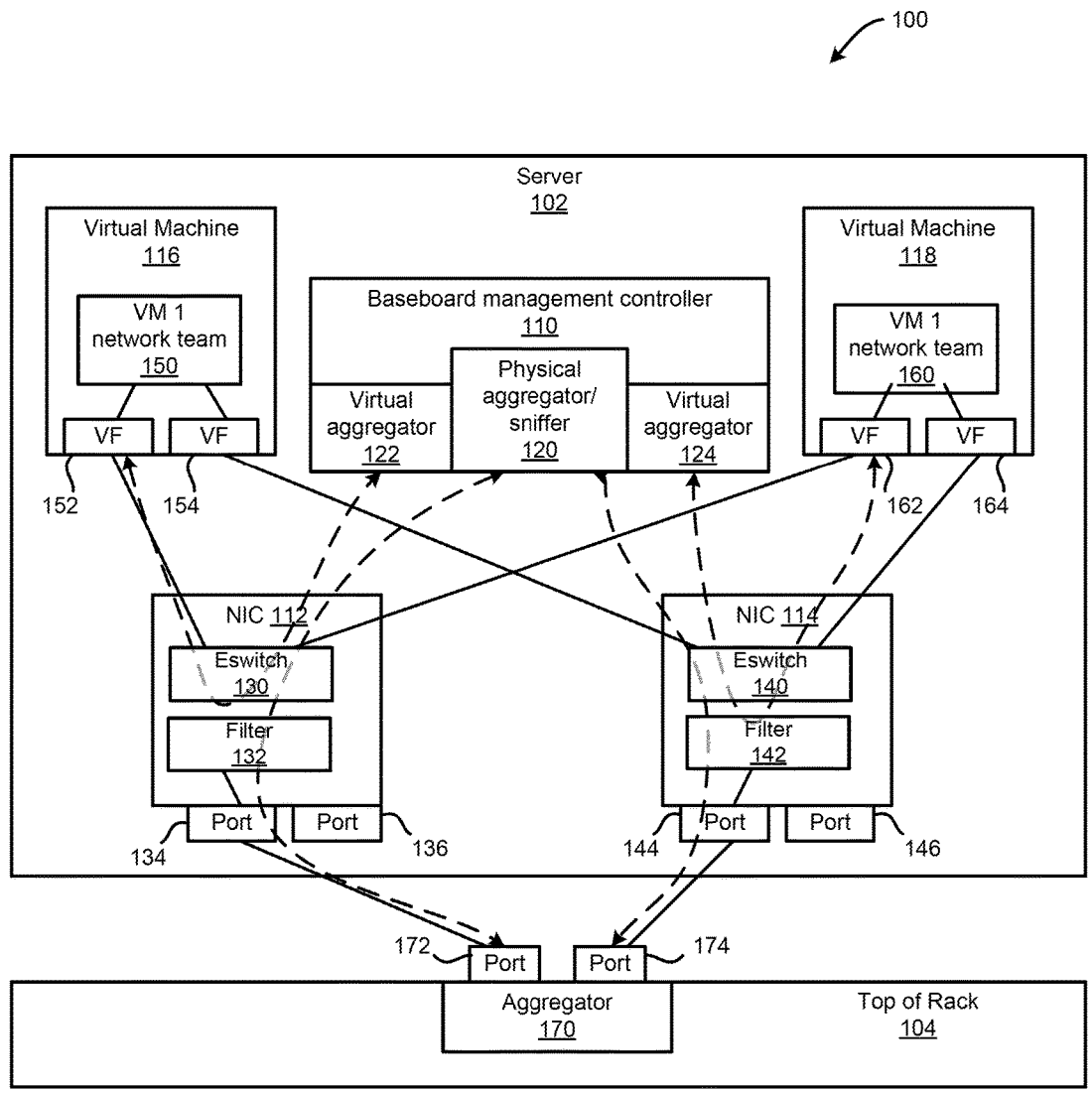
FIG. 1 is a block diagram of an information handling system according to an embodiment of the present disclosure.

FIG. 1 illustrates an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer (desktop, laptop, all-in-one computer, etc.), a consumer electronic device, a network server or storage device, a switch router, wireless router, or other network communication device, a network connected device (cellular telephone, tablet device, etc.), or any other suitable device, and can vary in size, shape, performance, price, and functionality and price. The information handling system can also be implemented as or incorporated into various devices, such as a laptop computer, a tablet computer, a set-top box (STB), a mobile information handling system, a palmtop computer, a desktop computer, a communications device, a wireless telephone, a smart phone, a wearable computing device, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the information handling system can be implemented using electronic devices that provide voice, video or data communication. Further, while a single information handling system is illustrated in FIG. 1, the term "system" shall also be taken to include any collection of systems or sub-systems that individually or jointly execute a set, or multiple sets, of instructions to perform one or more computer functions.

The information handling system 100 includes a server 102, and a top of rack 104 with which the server can communicate to transmit data to servers in other information handling systems. The server 102 includes a baseboard management controller 110, network interface cards (NICs) 112 and 114, and virtual machines 116 and 118. The controller 110 includes a physical aggregator 120, and virtual aggregators 122 and 124. The NIC 112 includes a switch 130, a filter 132, and ports 134 and 136. The NIC 114 includes a switch 140, a filter 142, and ports 144 and 146. The virtual machine 116 includes a virtual network team 150, and virtual functions 152 and 154. The virtual machine 118 includes a virtual network team 160, and virtual functions 162 and 164. The top of the rack 104 includes an aggregator 170, and ports 172 and 172. In different embodiments, the server 102 may include additional virtual machines, NICs, and the virtual machines and NICs can include additional ports without varying from the scope of the disclosure. Additional, the information handling system can include additional servers that can communicate with the top of rack 104 in the manner described below for server 102 without varying from the scope of the disclosure. The top of rack 104 is a device within the information handling system 100 that includes a physical switch, switches fabrics, communication ports, processor cores, and other components to monitor the servers in the information handling system 100, such as server 102, and to provide a communication link between the servers in the information handling system 100, and a communication link between the servers of the information handling system 100 and other servers of other information handling systems.

The virtual machines 116 and 118 can operate on the server 102, and can communicate with other servers in the information handling system 100 or other information handling systems via the top of rack 104. In an embodiment, the virtual functions 152 and 154 of virtual machine 116 and virtual functions 162 and 164 of virtual machine 118 can be utilized by the associated virtual machine for sending/receiving data when physical ports on the NICs 112 and 114 are virtualized using single root input/output virtualization (SR-IOV). In an embodiment, the controller 110 can operate as a moderator between the virtual machines 116 and 118, and the NICs or physical switches 112 and 114 to proxy link aggregation control protocol (LCAP) packets. The controller 110 can create separate system identification (ID) and key for each virtual function and switch pair, such that each virtual function on a NIC can be paired with a port on the top of rack 104 and that pair can be assigned a system ID and key. For example, if a single virtual port on NIC 116 is paired with both ports 172 and 174 on the top of rack 104, each pair, such as virtual function paired with port 172 and virtual function paired with port 174, can be assigned different system ID and key.

For example, NICs 112 and 114 can each have two virtual functions. In this embodiment, there can be a single key with the top of rack 104 for the two NICs 112 and 114. The controller 110 can detect this configuration and can create virtual aggregators for the number of virtual functions on the NICs 112 and 14. For example, in this case, two virtual aggregators can be created, such as virtual aggregators 122 and 124. The description of the virtual aggregators 122 and 124 and the grouping, bonding, or teaming between virtual functions and physical ports with be discussed with respect to SR-IOV. However, the virtualization of the ports on NICs 112 and 114 can also be performed through network partitioning (NPAR) where there can be multiple physical functions (PFs) associated with a single network port without varying from the scope of the disclosure. In an embodiment, the virtual functions can be associated with the virtual aggregators 122 and 124 to mirror the way the NICs 112 and 114 are associated with the key on the switch of the top of rack 104 to create a bond, team, or grouping between the virtual function and the aggregators, and a bond between the aggregators and the NICs. In this way, each virtual bond is presented with a separate partner as will be described in greater detail below with respect to FIG. 2.

Figure 2:
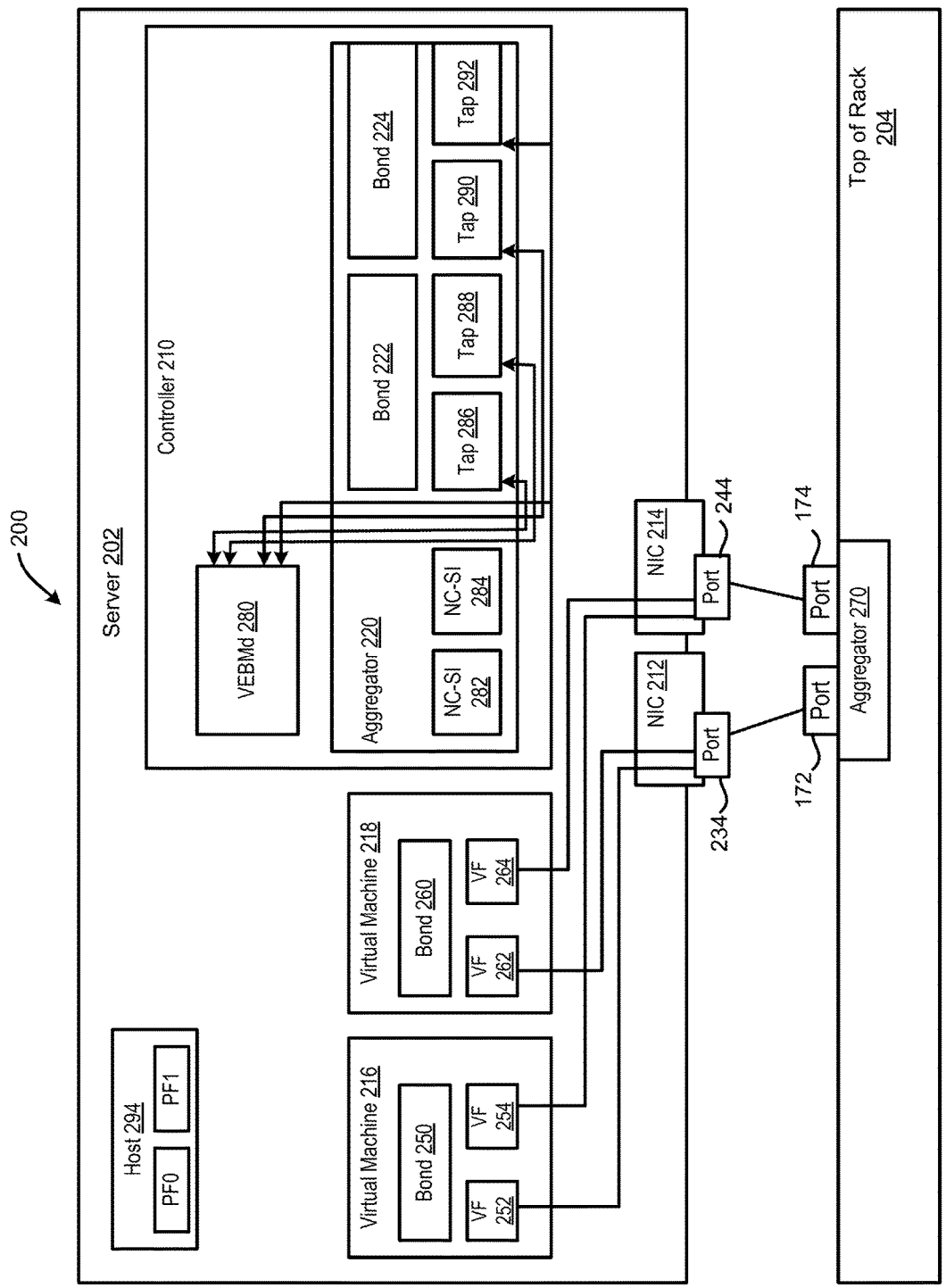
FIG. 2 is another block diagram of the information handling system according to an embodiment of the present disclosure.

FIG. 2 illustrates another embodiment of an information handling system 200 according to an embodiment of the present disclosure. The information handling system 200 includes a server 202, and a top of rack 204. The server 202 includes a baseboard management controller 210, network interface cards (NICs) 212 and 214, and virtual machines 216 and 218. The controller 210 includes a physical aggregator 220, and virtual aggregators or bonds 222 and 224. The NIC 212 includes a port 234, and the NIC 214 includes a port 244. The virtual machine 216 includes a virtual network team or bond 250, and virtual functions 252 and 254. The virtual machine 218 includes a virtual network team or bond 260, and virtual functions 262 and 264. The top of the rack 204 includes an aggregator 270, and ports 272 and 272. In an embodiment, the controller 210 can be connected to each of the NICs 212 and 214 by a NC-SI sideband of each individual NIC such as NC-SI 282 and NC-SI 284. In this embodiment, the controller 210 can be a host of virtual aggregators for the LACP protocol, and the combination of the network adapter and Hypervisor as the physical domain translator.

The controller 210 can cause the Virtual Ethernet Bridges (VEB) in the NICs 212 and 214 act like a line card in a real switch. For example, a real switch forwards management packets like LACP packets to a central processing unit (CPU), such as host processor 294, for processing. In an embodiment, server virtualization using SR-IOV can include attaching a virtual function (VF) of NICs 212 and 214 to an associated VEB. In an embodiment, the host processor 294 can include different physical functions, such as physical function 0 (PF0), and physical function 1 (PF1). The CPU implements LACP state machines. Additionally, a switch ASIC has a path for its CPU to send management packets that are port directed that can bypass other filters and match/actions in the controller 210.

The controller 210 includes a VEB management daemon (VEBMd) 280 to handle reception and transmission of LACP packets with the NICs 212 and 214. In an embodiment, the NICs 212 and 214 can be customized to route packets to and from the controller 210. In an embodiment, the NICs 212 and 214 can include firmware or custom match action rules that can cause the NICs to perform Distributed Switch Architecture (DSA) encapsulation/decapsulation on the packets in addition to the packet forwarding.

During operation, the VEBMd 280 can create a tap or pair for each virtual function on each port of each NIC 212 and 214. For example, the VEBMd 280 can create taps 286, 288, 290, and 292 based on each of the NICs 212 and 214 having a single port 234 or 244 and two respective virtual functions 252 and 254 or 262 and 264. The VEBMd 280 can listen to LACP packets coming in on the physical ports 234 and 244 and can create virtual aggregator bonds, such as bonds 222 and 224, over the taps 286, 288, 290, and 292 to match the packet transmission over the physical ports 234 and 244 from the switch 270 of the top of rack 204.

Based on SR-IOV a virtual machine, such as virtual machine 216 or 218, can bond or team its virtual functions to a port on a NIC, such as NIC 212 or 214. In response, LACP packets sent by the virtual machine can be redirected to bonds that VEBMd created. For example, the virtual machine 216 can bond virtual function 252 to port 234 of NIC 212, and can bond virtual 254 to port 244 of NIC 214. The virtual machine 216 can then store these bonds in the virtual team or bond 250. Thus, any LACP packet sent by the virtual machine can be redirected to bond 222 or 224 created by the VEBMd 280 depending on the virtual function that the packet originates from. In an embodiment, the bonds 222 and 224 have LACP state machines that are independent of an external switch state machine. Thus, in this embodiment, the VEBMd 280 can advertise the virtual machine bond/team 250 or 260 as the link partner to the bond 222 or 224, and the virtual machine bond/team will successfully come up.

In an embodiment, the controller 210 can be a 25G NIC controller, and can have controller ASICs with programmable SDN flow offload capabilities. The controller 210 can also have flexible match capabilities and flexible encapsulation/decapsulation. Thus, the pairing and bond creation can be accomplished by adding a match rule for LACP packets sent on each virtual function to the firmware of the NICs 212 and 214. In an embodiment, egress matches, such as from the virtual machines 216 and 218, can be based on function virtual, destination MAC address, such as 01:80:c2:00:00:02, protocol ether type, such as 0x8809, and LACP type, such as 0x01. In an embodiment, the virtual machine 216 can encapsulate packet using DSA, set port=virtual function 252 virtual port in the DSA header, and forward to NC-SI port 282.

In an embodiment, ingress matches, such as from the controller 210, can be based on DSA ether type, such as 0x8874, DSA header BRCM OP=01 Egress Directed, DSA header BRCM port=virtual function. In an embodiment, the controller 210 can forward the packet to the virtual virtual based on virtual function identified in the DSA header BRCM port, and can bypass any other MAC filters in the NIC 212. While the LACP packet bonding has been described using DSA encapsulation/decapsulation as the tunnel protocol between the NICs 212 and 214 and the controller 210, other tunnel protocols are also valid options, such as VxLAN, Geneve, NVGRE, VLAN, and QinQ, to communicate port information between the controller 210 and NICs 212 and 214.

In an embodiment, the controller 210 has an NC-SI interface, such as for each controller package on the NIC. The VEBMd opens a RAW socket on each NC-SI interface. In an embodiment, if the VEBMd 280 is listening for LACP packets coming from the top of rack 204 through physical ports 234 and 244, the VEBMd 280 can listen with a filter set for MAC 01:80:c2:00:00:02 and ether types 0x8809. In an embodiment, if the VEBMd 280 is listening for DSA encapsulated LACP packets coming from the virtual machines 216 ad 218, the VEBMd 280 can listen with a filter set for ether types 0x8874.

In an embodiment, if each port of the NICs 212 and 214 have multiple physical functions, and the host 294 and the virtual machines 216 and 218 have physical functions, such as during virtualization utilizing NPAR, the bonding or grouping of virtual functions to ports can be done in one of two ways. In one situation, one PF from each port, such as port 234 and 244, can be designated as a pass through PF, and this PF can be associated with the host 294 to allow data associated with this PF to be pass through to the host 294. In another situation, all of the PFs can be treated like VFs and another virtual aggregator can be created and utilized to maintain a LACP connection to the PFs of the host 294 that the top of rack 204 can see.

Figure 3:
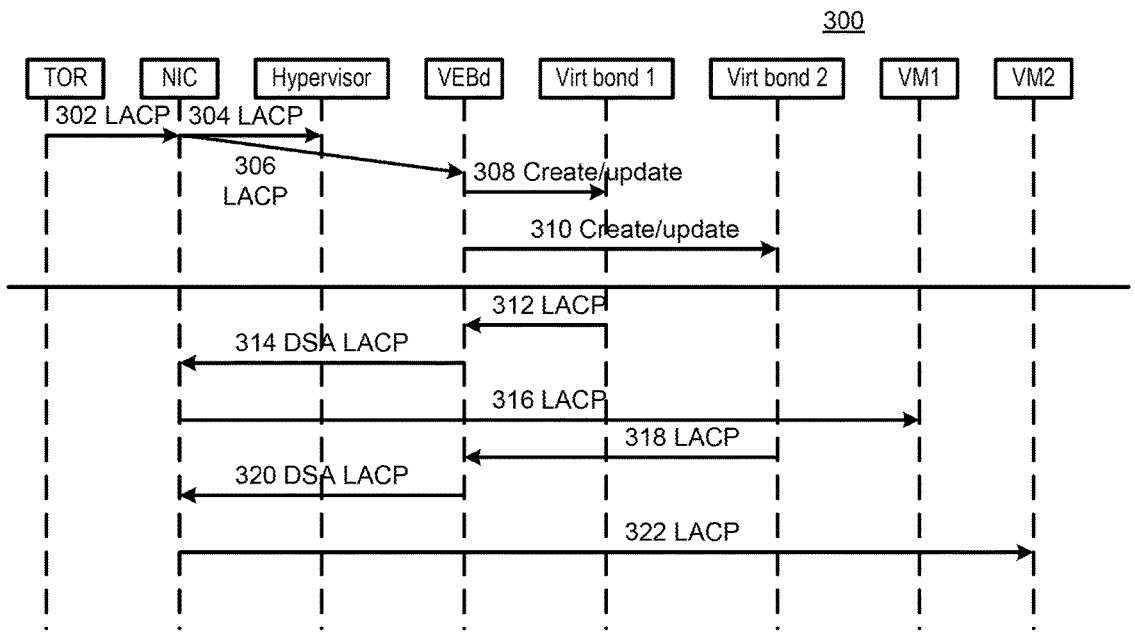
FIG. 3 is a sequence diagram for incoming link aggregation control protocol (LACP) packets according to an embodiment of the present disclosure.

FIG. 3 illustrates a sequence diagram 300 for incoming link aggregation control protocol (LACP) packets according to an embodiment of the present disclosure. At sequence 302, a LACP packet is received at a NIC from a port on the top of rack. The NIC then passes the LACP packet to the hypervisor at sequence 304, and to the VEBMd at sequence 306. In an embodiment, the hypervisor can be executed on the host processor of the controller. Upon the LACP packet being received, the VEBMd can create/update a first bond associated with the port of the top of rack that transmitted the LACP packet at sequence 308. The VEBMd can also create/update a second bond for the port at sequence 310. For example, if the port that sent the LACP packet is associated with two different virtual functions, two different bonds can be associated with the port and the VEBMd can update both of the bonds associated with the port. In an embodiment, the update to the bonds can be based on a change in the system ID and key for the port, and the different system ID and key can be found the LACP packet.

A LACP packet can be sent from the first bond to the associated first virtual machine of the NIC via sequences 312-316. At sequence 312, an LACP packet can be sent from the first bond to the VEBMd. In an embodiment, the LACP packet can identify a virtual machine within a particular NIC. Upon the LACP packet being received, the VEBMd can perform DSA encapsulation on the packet, and the DSA header can include the destination NIC port and virtual machine. The VEBMd can then send the DSA LACP packet to the NIC at sequence 314. The NIC can then decapsulate the DSA LACP packet, and forward the decapsulated LACP packet to a first virtual machine designated in the DSA header at sequence 316.

A LACP packet can be sent from the second bond to the associated second virtual machine of the NIC via sequences 318-322. At sequence 318, the LACP packet can be first sent from the second bond to the VEBMd. Upon the LACP packet being received, the VEBMd can perform DSA encapsulation on the packet, and the DSA header can include the destination NIC port and virtual machine. The VEBMd can then send the DSA LACP packet to the NIC at sequence 320. The NIC can then decapsulate the DSA LACP packet, and forward the decapsulated LACP packet to the second virtual machine designated in the DSA header at sequence 322.

Figure 4:
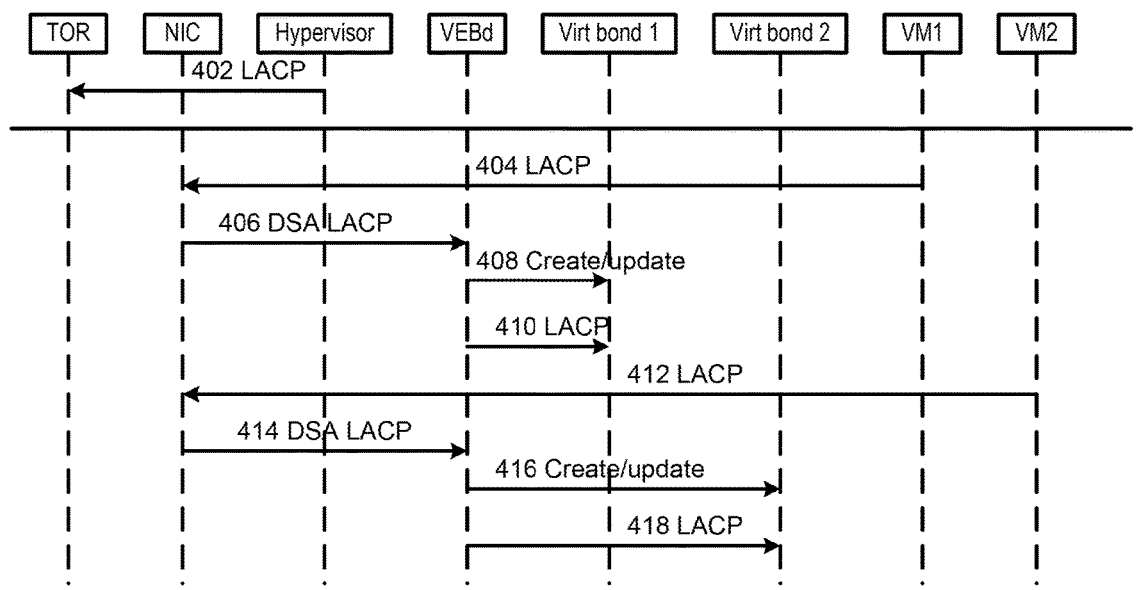
FIG. 4 is a sequence diagram for outgoing LCAP packets according to an embodiment of the present disclosure.

FIG. 4 illustrates a sequence diagram 400 for outgoing LCAP packets according to an embodiment of the present disclosure. The hypervisor executed on the host can send one or more LACP packets to a port on the top of rack as shown in sequence 402.

However, additional sequences are performed prior to the LACP packet being received at the port on the top of rack. The first sequence 404 includes an LACP packet being sent from the first virtual machine to the associated NIC. In an embodiment, the LACP packet can identify the destination port. The NIC can encapsulate the LACP packet and include the destination information within the DSA header. The NIC can then send the DSA LACP packet to the VEDMd at sequence 406. The VEBMd can then determine whether the first bond associated with the virtual machine and port pair needs to be created/updated based on the system ID and key in the DSA header of the LACP packet at sequence 408. The VEBMd can then send the LACP packet to the first bond associated with the destination port of the top of rack, which in turn can forward the packet to the port at sequence 410.

At sequence 412 a second LACP packet can be sent from the second virtual machine to the associated NIC. In an embodiment, the LACP packet can identify the destination port of the top of rack. The NIC can then encapsulate the LACP packet and include the destination information within the DSA header. The NIC can then send the DSA LACP packet to the VEDMd at sequence 414. The VEBMd can then determine whether the second bond associated with the second virtual machine and port pair needs to be created/updated based on the system ID and key in the DSA header of the LACP packet at sequence 416. The VEBMd can then send the LACP packet to the second bond associated with the destination port of the top of rack, which in turn can forward the packet to the port at sequence 418.

Figure 5:
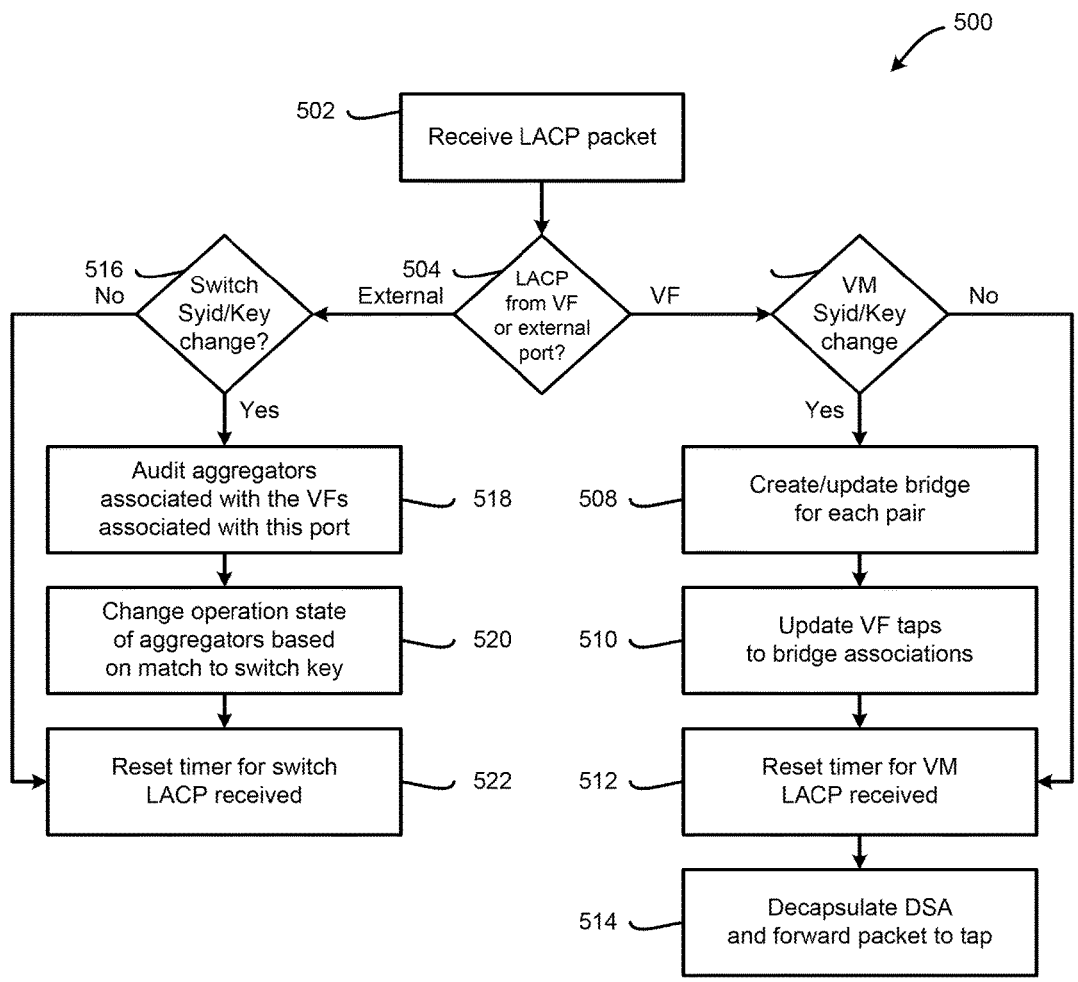
FIG. 5 is a flow diagram of a method for creating aggregate teams based on a received LACP packet according to an embodiment of the present disclosure.

FIG. 5 is a flow diagram of a method 500 for creating aggregate teams in an information handling system based on a received LACP packet according to an embodiment of the present disclosure. In an embodiment, the method 500 is performed by the VEBd 280 of FIG. 2. At block 502, a raw Ethernet packet is received. In an embodiment, the Ethernet packet can be a LACP packet. In an embodiment, the packet can be for a specific system ID, such as MAC 01:80:c2:00:00:02. A determination is made whether the pack came from a virtual function within a server or from a port external to the server. In an embodiment, this determination can be based on the Ether Type of the packet. For example, the Ether Type can be used by the VEBd to determine if the packet came from a switch, such as the top of the rack 104 of FIG. 1, or from one of the virtual functions within in the server 102 of FIG. 1. In an embodiment, an Ether Type of 0x8809 can indicate that the packet came from the top of rack, and an Ether Type of 0x8874 can indicate that the packet is a DSA packet from one of the virtual functions.

If the packet is from a virtual function within the information handling system 100, the flow continues at block 506 and a determination is made whether the system ID and key for the virtual machine associated with the virtual function that sent the packet has been changed. If not, the flow continues at block 512, and a timer for receiving LACP packets from a virtual machine is reset. Otherwise, the flow continues at block 508 and a system ID and key in the received LACP packet are compared to the system ID and key that were previously received from that virtual function to determine whether a bridge needs to be created or updated for the switch/virtual machine pair associated with the received LACP. For example, if the virtual function was previously associated with a different system ID and key, the current tap corresponding to that virtual function should be removed from a virtual Aggregator of a controller within the server.

In an embodiment, if the tap corresponding to the virtual function is the last tap in the virtual aggregator, then the virtual aggregator is deleted as well. If the virtual machine system ID and key have changed, the system ID and key already associated with a virtual aggregator of the tap for this virtual machine is added to the virtual aggregator. However, if the received system ID and key are new, and there is a switch key on a port associated with the virtual function, then a new virtual aggregator is created and a new tap for this virtual function is added to the virtual aggregator bond at block 508. In an embodiment, a virtual aggregator will be disabled and in a faulted state until there are virtual functions in the virtual machine bond for each port in the switch key. At block 510, virtual function taps to bridge associations are updated based on the new/changed system IDs and keys.

At block 512, a timer for receiving LACP packets from a virtual machine is reset. In an embodiment, the timer is set to a length of time between subsequent LACP should be received. At block 514, a DSA header is removed from the LACP packet and the packet is placed on the tap associated with the virtual function. In an embodiment, after the DSA header is removed, the decapsulated packet can then flow over the tap to the virtual aggregator bond, and the virtual aggregator bond can use a linux kernel bond driver to receive and send LACP packets to the proper virtual function.

If at block 504, the LACP packet is determined to be received from a switch at the top of rack, then the flow continues at block 516 and a determination is made whether the switch system ID and key have changed. If the switch system ID and key have not changed, then the flow continues to block 522 and a timer for receiving LACP packets from a virtual machine is reset. If the switch system ID and key have changed, then this change should be applied to all of the virtual functions associated with the port of the switch that sent the LACP packet. At block 518, the virtual aggregators associated with the virtual functions of this port are audited. For example, the audit can determine whether the bond between the port and the virtual function match the new system ID and key. The operation state of the aggregators are changed based on the audit at block 520. In an embodiment, if there are operational virtual aggregators associated these virtual functions of the port, these virtual aggregators will probably go into a fault state and be disabled because the virtual machine bonds no longer match the switch key until an updated LACP is received from the virtual machine that corrects the mismatch between the switch system ID and key. In an embodiment, the converse can also be true, an aggregator that was previously disabled because it did not have virtual functions for each port in the switch key may now match and become enabled. At block 522 and a timer for receiving LACP packets from a virtual machine is reset.

Figure 6:
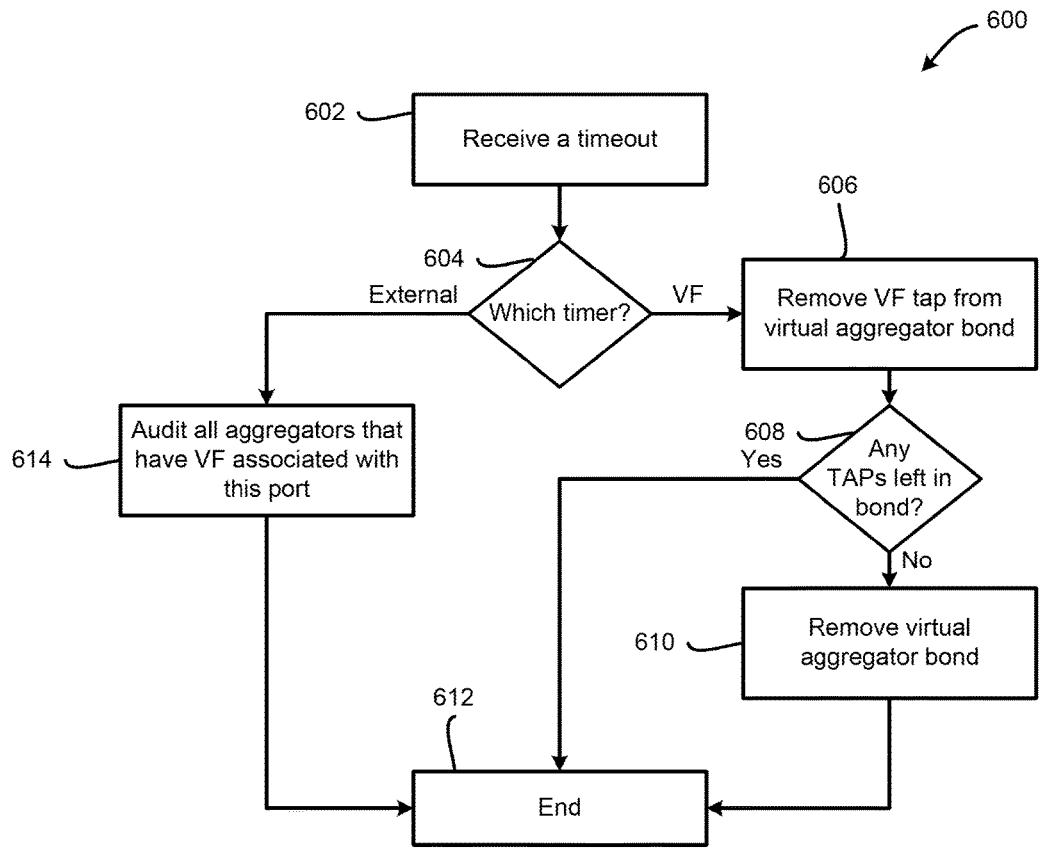
FIG. 6 is a flow diagram of a method for handling a timeout in a controller of the information handling system according to an embodiment of the present disclosure.

FIG. 6 is a flow diagram of a method for handling a timeout in a controller of the information handling system according to an embodiment of the present disclosure. At block 602, a timeout is received. A determination is made whether the timeout is associated with a virtual function or an external port at block 604. In an embodiment, if the timeout is associated with a virtual function, then that virtual function may have stopped receiving LACP packets. At block 606, a tap for this virtual function is removed from the virtual aggregator associated with an old virtual machine system ID and key, and the system ID and key are nulled. At block 608, a determination is made whether any taps are left in the aggregator bond. If there are taps left in the virtual aggregator, then the flow ends at block 612. If not, the virtual aggregator bond is removed at block 610, and the flow ends at block 612.

If at block 604, the determination is that the timeout is associated with an external port that has stopped receiving LACP packets from the switch, then all the aggregator bonds that have virtual functions tied to this port are audited at block 614. In an embodiment, during the audit, if the aggregator bond does not match with one virtual function in the aggregator bond for every port in the switch, then the aggregator is disabled and placed in a fault condition.

Figure 7:
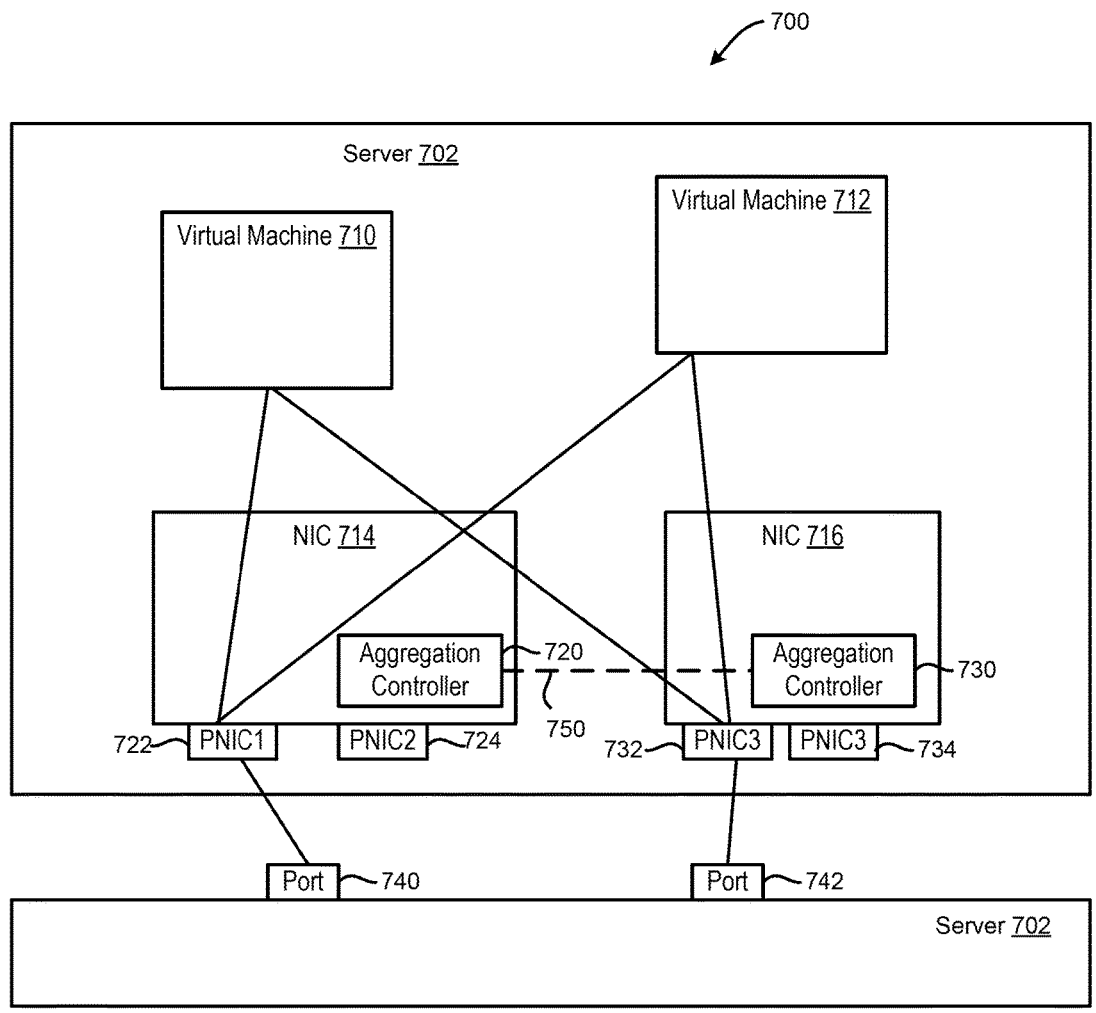
FIG. 7 is a block diagram of another embodiment of the information handling system according to an embodiment of the present disclosure.

FIG. 7 illustrates a block diagram of another embodiment of the information handling system 700 according to an embodiment of the present disclosure. The information handling system 700 includes a server 702 and a top of rack 704. The server 702 includes virtual machines 710 and 712, and NICs 714 and 716. The NIC 714 includes an aggregation controller 720 and ports 722 and 724. The NIC 716 includes an aggregation controller 730 and ports 732 and 734. The top of rack 704 includes ports 740 and 742. In this embodiment, the controller 110 of FIG. 1 can be implemented as dual aggregation controllers 720 and 730, and a single aggregation controller can be located within each of the NICs 714 and 716. The aggregation controllers 720 and 730 can operate in a similar manner to that controller 110 discussed above. However, the aggregation controllers 720 and 730 can use peer-to-peer messaging 750 between NICs 714 and 716 to establish an LACP proxy with a common database. In an embodiment, the common database can be located in either NIC 714 or 716 depending whether aggregation controller 720 or 730 is the master aggregation controller. In an embodiment, LACP state machines and partner keys can be maintained by the negotiated master, and LACP packets can forwarded for response by the master aggregation controller, where the extended ports of the slave adapters are represented. In this embodiment, the requirement for packet filtering over a sideband connection as disclosed above is removed. The aggregation controllers can be implemented in the hypervisor, or other software running on the host central processing unit, such as processor 802 of FIG. 8.

Figure 8:
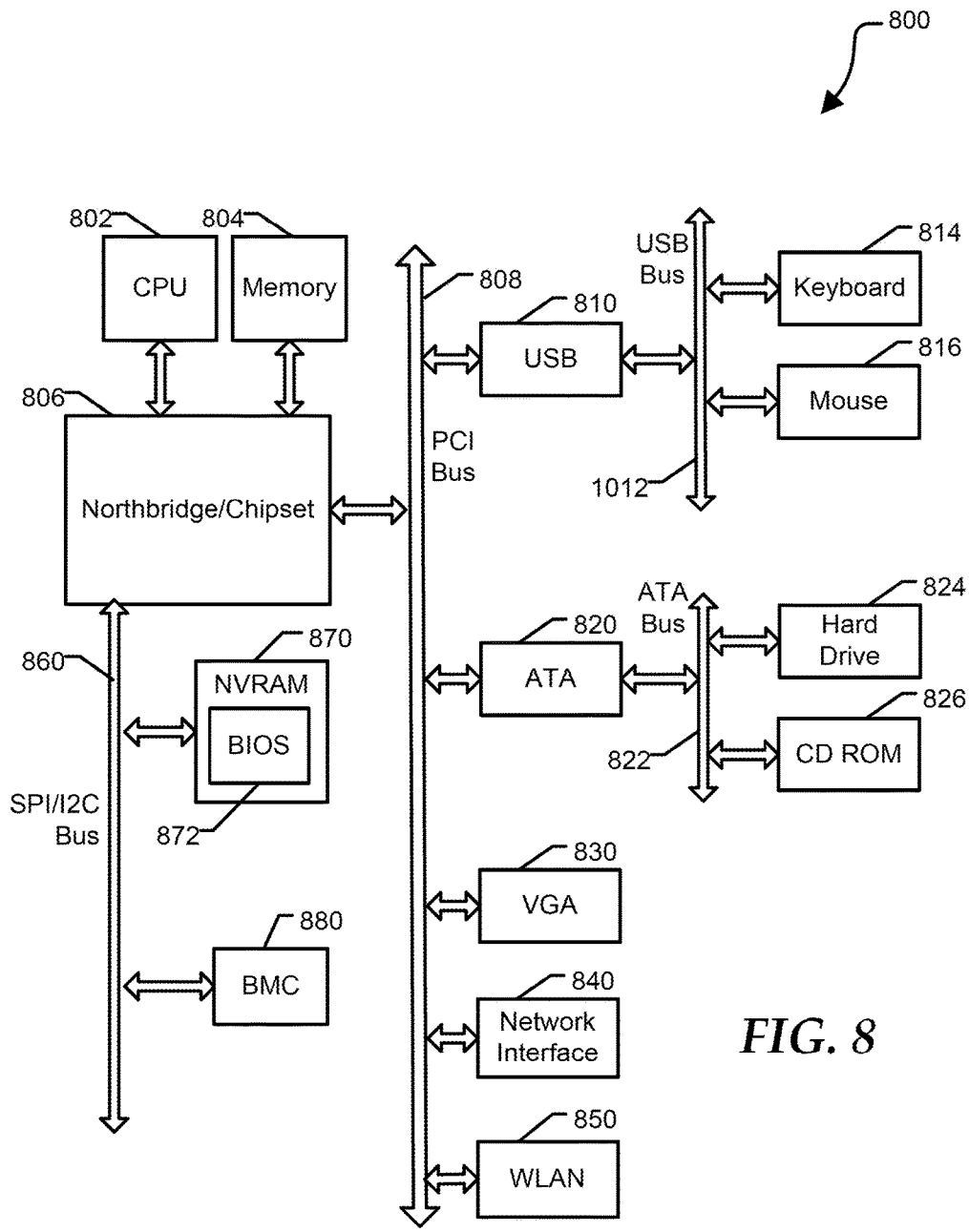
FIG. 8 is a block diagram of a general information handling system according to an embodiment of the present disclosure.

FIG. 8 shows an information handling system 800 including a processor 802, a memory 804, a northbridge/chipset 806, a PCI bus 808, a universal serial bus (USB) controller 810, a USB 812, a keyboard device controller 814, a mouse device controller 816, a configuration an ATA bus controller 820, an ATA bus 822, a hard drive device controller 824, a compact disk read only memory (CD ROM) device controller 826, a video graphics array (VGA) device controller 830, a network interface controller (NIC) 840, a wireless local area network (WLAN) controller 850, a serial peripheral interface (SPI) bus 860, a NVRAM 870 for storing BIOS 872, and a baseboard management controller (BMC) 880. BMC 880 can be referred to as a service processor or embedded controller (EC). Capabilities and functions provided by BMC 880 can vary considerably based on the type of information handling system. For example, the term baseboard management system is often used to describe an embedded processor included at a server, while an embedded controller is more likely to be found in a consumer-level device. As disclosed herein, BMC 880 represents a processing device different from CPU 802, which provides various management functions for information handling system 800. For example, an embedded controller may be responsible for power management, cooling management, and the like. An embedded controller included at a data storage system can be referred to as a storage enclosure processor.

For purpose of this disclosure information handling system 800 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 800 can include processing resources for executing machine-executable code, such as CPU 802, a programmable logic array (PLA), an embedded device such as a System-on-a-Chip (SoC), or other control logic hardware. Information handling system 800 can also include one or more computer-readable medium for storing machine-executable code, such as software or data.

System 800 can include additional processors that are configured to provide localized or specific control functions, such as a battery management controller. Bus 860 can include one or more busses, including a SPI bus, an I2C bus, a system management bus (SMBUS), a power management bus (PMBUS), and the like. BMC 880 can be configured to provide out-of-band access to devices at information handling system 800. As used herein, out-of-band access herein refers to operations performed prior to execution of BIOS 872 by processor 802 to initialize operation of system 800.

BIOS 872 can be referred to as a firmware image, and the term BIOS is herein used interchangeably with the term firmware image, or simply firmware. BIOS 872 includes instructions executable by CPU 802 to initialize and test the hardware components of system 800, and to load a boot loader or an operating system (OS) from a mass storage device. BIOS 872 additionally provides an abstraction layer for the hardware, such as a consistent way for application programs and operating systems to interact with the keyboard, display, and other input/output devices. When power is first applied to information handling system 800, the system begins a sequence of initialization procedures. During the initialization sequence, also referred to as a boot sequence, components of system 800 are configured and enabled for operation, and device drivers can be installed. Device drivers provide an interface through which other components of the system 800 can communicate with a corresponding device.

Information handling system 800 can include additional components and additional busses, not shown for clarity. For example, system 800 can include multiple processor cores, audio devices, and the like. While a particular arrangement of bus technologies and interconnections is illustrated for the purpose of example, one of skill will appreciate that the techniques disclosed herein are applicable to other system architectures. System 800 can include multiple CPUs and redundant bus controllers. One or more components can be integrated together. For example, portions of northbridge/chipset 806 can be integrated within CPU 802. Additional components of information handling system 800 can include one or more storage devices that can store machine-executable code, one or more communications ports for communicating with external devices, and various input and output (I/O) devices, such as a keyboard, a mouse, and a video display. An example of information handling system 800 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 800 can include a set of instructions that can be executed to cause the information handling system to perform any one or more of the methods or computer based functions disclosed herein. The information handling system 800 may operate as a standalone device or may be connected to other computer systems or peripheral devices, such as by a network.

In a networked deployment, the information handling system 800 may operate in the capacity of a server or as a client user computer in a server-client user network environment, or as a peer computer system in a peer-to-peer (or distributed) network environment. The information handling system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single information handling system 800 is illustrated, the term "system" shall also be taken to include any collection of systems or sub-systems that individually or jointly execute a set, or multiple sets, of instructions to perform one or more computer functions.

The information handling system 800 can include a disk drive unit and may include a computer-readable medium, not shown in FIG. 8, in which one or more sets of instructions, such as software, can be embedded. Further, the instructions may embody one or more of the methods or logic as described herein. In a particular embodiment, the instructions may reside completely, or at least partially, within system memory 804 or another memory included at system 800, and/or within the processor 802 during execution by the information handling system 800. The system memory 804 and the processor 802 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving, at a network interface card of a server, a link aggregation control protocol (LACP) packet from a port on a top of a rack;
   transmitting the LACP packet to a controller of the server;
   updating or creating a bond associated with the port and a destination virtual machine of the LACP packet;
   transmitting the LACP packet from the bond to the network interface card; and
   in response to the LACP packet being received at the network interface card, providing the LACP packet to the destination virtual machine.

2. The method of claim 1, further comprising:
   transmitting the LACP packet to a hypervisor executed on a host processor of the controller while the LACP packet is being transmitted to the controller.

3. The method of claim 1, wherein the transmission of the LACP packet to the controller is to a daemon of the controller.

4. The method of claim 1, wherein determining whether to update or create the bond is based on a system identification and key for the port in the LACP packet.

5. The method of claim 1, transmitting the LACP packet from the bond to the network interface card further comprises:
   in response to the LACP packet being received at the controller, performing, by the controller, Distributed Switch Architecture (DSA) encapsulation on the packet, wherein a DSA header includes a destination NIC port and the destination virtual machine for the LACP packet.

6. The method of claim 5, transmitting the LACP packet from the bond to the network interface card further comprises:
transmitting the DSA encapsulated LACP packet to the network interface card.

7. The method of claim 6, further comprising:
decapsulating, at the network interface card, the DSA encapsulated LACP packet; and
transmitting the decapsulated LACP packet to destination virtual machine designated in a DSA header.

8. An information handling system comprising:
a top of rack including a port, the port configured to transmit a link aggregation control protocol (LACP) packet; and
a server including:
a network interface card to receive the LACP packet from the port of the top of rack, and to forward the LACP packet; and
a controller to receive the LACP packet from the network interface card, and to update or create a bond associated with the port and a destination virtual machine of the LACP packet, wherein the LACP packet is transmitted from the bond to the network interface card, and in response to the LACP packet being received at the network interface card the LACP packet is provided to the destination virtual machine.

9. The information handling system of claim 8, wherein the transmission of the LACP packet to the controller is to a daemon of the controller.

10. The information handling system of claim 8, wherein the controller is configured to determine whether to update or create the bond based on a system identification and key for the port in the LACP packet.

11. The information handling system of claim 8, wherein the controller is configured to further perform Distributed Switch Architecture (DSA) encapsulation on the packet to in response to the LACP packet being received at the controller, wherein a DSA header includes a destination NIC port and the destination virtual machine for the LACP packet.

12. The information handling system of claim 11, wherein the controller is configured further to transmit the DSA encapsulated LACP packet to the network interface card.

13. The information handling system of claim 12, wherein the network interface card further to decapsulate the DSA LACP packet, and to transmit the decapsulated LACP packet to destination virtual machine designated in a DSA header.

* * * * *